United States Patent Office 3,361,586
Patented Jan. 2, 1968

3,361,586
PROCESS OF TREATING POLYIMIDE SURFACE WITH POLYALKYLENIMINES AND POLYALKYLENE POLYAMINES
William B. Lindsey, Tonawanda, N.Y., assignor to E. I. du Pont de Nemours and Company, Wilmington, Del., a corporation of Delaware
No Drawing. Filed Oct. 1, 1964, Ser. No. 400,939
9 Claims. (Cl. 117—46)

This invention relates to polyimide articles such as films and more particularly to the treatment of such articles with adhesion promoting agents.

The use of polyalkylenimines and polyalkylene polyamines for treatment of plastic articles generally and plastic films in particular is known to be useful for promotion of adhesion to other polymeric or metallic materials. See for example Wooding U.S. Patent No. 2,887,-405 issued May 19, 1959.

It has previously been found that results from the use of such adhesion promoting agents are improved when a small amount of a surface active agent is incorporated with the adhesion promoting agent.

However, when attempts were made by me to adapt the foregoing knowledge to achieve improved adhesion of aromatic polyimide articles such as films to other surfaces, unsatisfactory results were obtained. When aqueous polyalkylenimine solutions were used, the aromatic polyimide film surfaces wetted non-uniformly. Attempts to solve this problem by addition of ordinary surface active or wetting agents caused interference with subsequent adhesion of the dry film.

According to the present invention, excellent heat-sealable articles of aromatic polyimides are prepared with satisfactory adhesion characteristics by treating them with an aqueous solution containing two essential components:

(1) An agent of the class consisting of polyalkylenimines and polyalkylene polyamines; and
(2) A cationic quaternary ammonium chloride.

It has been found according to the present invention that, for some reason, the use of this combination of two essential ingredients effects uniform wetting without interference with adhesion.

The polyalkylenimine and polyalkylene polyamine solutions will ordinarily be at a concentration of from about 0.1 to 1.0% by weight or higher. Preferably, a polyalkylenimine or polyalkylene polyamine concentration of about 0.3 to 0.5% by weight will be used. The concentration of the quaternary ammonium chloride will ordinarily be from about 0.05 to 5.0% by weight. Higher concentrations can be used but do not appear to be necessary.

The treating solution can be applied to the polyimide surface by any convenient method such as dipping, painting, spraying, rolling, brushing, or the like.

Following application of the treating solution to the polyimide surface, the surface is heated to a temperature of at least 200° C., and preferably about 225° to 275° C., for a time sufficient to decompose the quaternary ammonium chloride and drive off the decomposition products, leaving no residue on the treated surface. This heating can be done as a separate step, as during drying, or it can conveniently be a part of a continuous operation wherein the treated surface is dried by heating at a moderate temperature, followed by bringing the treated surface to the decomposition temperature of the quaternary ammonium chloride by brief contact with a heating device such as a hot laminating roll positioned a short distance such as a few inches prior to the point of lamination of the treated surface to other material. Ordinarily, at temperatures above about 225° C., times of from about 3 to 10 seconds are quite satisfactory but shorter or longer times can of course be used depending on such factors as the temperature, amount of treating solution applied, concentration of ingredients in the solution, etc., as will be readily understood.

The preferred polyalkylenimines for use in the process of this invention are those derived from the homopolymerization of one or copolymerization of two or more of the lower 1,2-alkylenimines (aziridines) wherein the alkylene radical contains from 2–8 carbon atoms. Because of the availability and relatively low cost, polyethylenimine and polypropylenimine are particularly preferred. Polyethylenimine having a viscosity within the range of about 2.2 to about 2.8 centistokes as measured at 1% concentration in aqueous solution at 100° F., is particularly effective. The polyalkylenimines derived from 1,3-alkylenimines (azetidines) can also be employed since they possess chemical and physical properties similar to the polymers derived from the 1,2-imines.

It is further preferred that the polyalkylenimine used in this invention have a molecular weight within the range of from about 30,000 to about 500,000, since such materials are non-toxic and can be conveniently handled and stored without gelation in the form of concentrated solutions, i.e. 20–30% by weight. Polyalkylenimines having very low molecular weights, below about 5000, are less effective while those having very high molecular weights, about 800,000, are much less soluble in water and yield thick syrupy solutions at high concentration. In general, the linear polyalkylenimines are preferred over the cross-linked varieties since they can be employed with satisfactory results using a lower concentration of quaternary ammonium chloride and also are somewhat less prone to precipitate and form a sludge in the presence of impurities. A typical polyethylenimine satisfactory for use in this invention is supplied by the Dow Chemical Co. under the designation QX–3410–1.

Illustrative of suitable polyalkylene polyamines can be mentioned diethylene triamine, triethylene tetramine, tetraethylene pentamine and 3,3′-iminobispropylamine. In addition, several commercial formulations such as the "Versamid" thermoplastic polymers, containing condensates of polymerized unsaturated fatty acids with amines such as ethylene diamine, are also suitable. The effectiveness of the polyamines is enhanced by adding a lower fatty acid. This helps solubilize the agent. The product is fugitive and decomposes to give the free imine or amine during the heating step which decomposes the quaternary ammonium salt.

Illustrative of cationic quaternary ammonium chloride useful in the process of the present invention are those wherein, of the four substituents in the quaternary salt, at least two are alkyl groups of 1 through 4 carbon atoms; one of the other two is a radical such as alkyl of 1 through 4 carbon atoms, benzyl, and alkyl benzyl of up through 10 carbons such as p-methylbenzyl and 3,4-dimethylbenzyl; and the fourth substituent is a long chain substituent such as alkyl of 10 through 20 carbons, methyldodecylbenzyl and phenoxyethoxyethyl. Representative quaternary ammonium chloride are:

dodecyl trimethyl ammonium chloride
hexadecyl trimethyl ammonium chloride
octadecyl trimethyl ammonium chloride
dodecyl triethyl ammonium chloride
hexadecyl triethyl ammonium chloride
octadecyl triethyl ammonium chloride
dodecyl tri n-propyl ammonium chloride
dodecyl tri isopropyl ammonium chloride
benzyl hexadecyl dimethyl ammonium chloride hexadecyl dimethyl ethyl ammonium chloride
diisobutyl phenoxyethoxyethyl dimethylbenzyl ammonium chloride
methyldodecylbenzyl trimethyl ammonium chloride
methyldodecylxylylene bis(trimethyl ammonium chloride)
octadecyl benzyl dimethyl ammonium chloride and mixtures thereof such as commercial mixtures of which the composition of the alkyl component is, by weight, about 50% dodecyl, usually about 65% C-12 to C-14, and in some cases: 8% octyl, 9% decyl, 47% dodecyl, 18% tetradecyl, 8% hexadecyl, 5% octadecyl, 5% octadecenyl and octadecadienyl.

The aromatic polyimide articles useful in the practice of the present invention are known in the art. Such polyimides are characterized by the recurring unit:

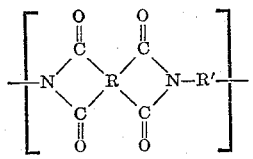

wherein R is a tetravalent radical containing at least six carbon atoms in a ring, said ring characterized by benzenoid unsaturation, the four carbonyl groups being attached to separate carbon atoms and each pair of carbonyl groups being attached to adjacent carbon atoms in the R radical; and wherein R' is a divalent benzenoid radical selected from the group consisting of

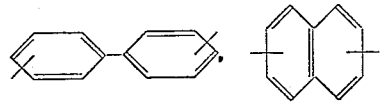

and

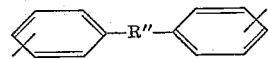

wherein R'' is selected from the group consisting of an alkylene chain having 1-3 carbon atoms,

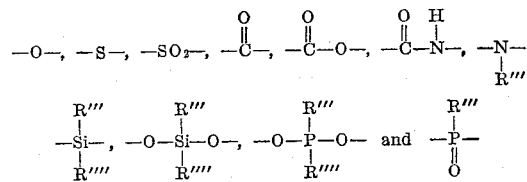

where R''' and R'''' are radicals having 1-6 carbon atoms and each is alkyl or aryl.

The polyimides are conveniently prepared by reacting at least one organic diamine having the structural formula $H_2N-R'-NH_2$ wherein R' is as defined above with at least one tetracarboxylic acid dianhydride having the structural formula:

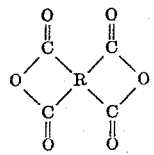

wherein R is a tetravalent organic radical containing at least six carbon atoms characterized by benzenoid unsaturation, the four carbonyl groups being attached to separate carbon atoms and carbon atoms of each pair of carbonyl groups being attached to adjacent carbon atoms in the radical.

Illustrative of diamines suitable for use in preparation of the above polyimides are 4,4'-diamino-diphenyl propane, 4,4'-diamino-diphenyl methane, benzidine, 3,3'-dichloro-benzidine, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diamino-diphenyl phosphine oxide and 4,4'-diamino-diphenyl N-methyl amine, 4,4'-diamine-diphenyl N-phenyl amine, 4,4'-diamino benzophenone, 3,4-diaminobenzanilide, 3,4'-diamino phenyl benzoate, and mixtures thereof.

Illustrative of dianhydrides suitable for use in preparation of the above polyimides are pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride, bis(3,4-dicarboxyphenyl) ether dianhydride, 1,4,5,8-naphthalene tetracarboxylic dianhydride, 3,4,3',4'-benzophenone tetracarboxylic dianhydride, 2,3,2',3'-benzophenone tetracarboxylic dianhydride, 2,3,3',4'-benzophenone tetracarboxylic dianhydride, etc.

The polyimides can of course be in any desired physical form such as fibers, sheets, discs, rods, tubes, powders, etc., or as coatings on other materials. Generally, the advantages of this invention are most useful when the polyimide is in film or sheet form.

The adhesion promotion obtained by the process of this invention is useful in adhering the polyimide to other surfaces such as the same or different polyimides, metals, glass, polymeric materials, e.g., cellulosic materials, polyolefins, polyesters, polyurethanes, and especially perfluorocarbon polymers such as polytetrafluoroethylene and copolymers of tetrafluoroethylene with hexafluoropropylene.

This invention will be more clearly understood by reference to the following examples wherein parts and percentages are by weight unless otherwise indicated. These examples illustrate specific embodiments of the present invention and should not be construed to limit the invention in any way.

*Example 1*

Solutions were made of 0.5% of polyethylenimine in water, containing 0.01%, 0.05%, 0.1%, 2.5% and 5.0% of a cationic quaternary ammonium salt sold as "Arquad C-50," understood to contain 33% by weight of an alkyl trimethyl ammonium chloride in which the alkyl component is about 8% octyl, 9% decyl, 47% dodecyl, 18% tetradecyl, 8% hexadecyl, 5% octadecyl, 5% octadecenyl and octadecadienyl, the remainder of the formulation consisting of water (50%) and sodium chloride (17%). The solution containing 0.01% of the quaternary ammonium chloride formulation balled up on the surface of a film of an aromatic polyimide but all of the others wetted the surface of the film uniformly.

*Example 2*

A solution of 0.5% polyethylenimine and 0.1% "Arquad C-50" (as in Example 1) in water was spread uniformly onto the surface of a film of the polypyromellitimide of bis(4-aminophenyl) ether. The film was dried at room temperature and a 1 mil film of "Teflon" FEP perfluorocarbon was pressed against the treated surface of the polyimide film at 300° C. for 5 minutes. The laminate thus prepared was folded with the perfluorocarbon-coated sides together and heat-sealed at 300° C. for 1 minute. The following test data were obtained: 1656 grams per inch peel strength, compared to 1230 grams per inch for a control on which the treating solution for the surface of the polyimide film was a 0.5% solution of polyethylenimine in methanol.

*Example 3*

A solution of 0.5% "Arquad C-50" (as in Example 1) and 0.5% tetraethylene pentamine in water was painted onto the surface of a film of the polypyromellitimide of bis(4-aminophenyl) ether, which was then allowed to dry in air at room temperature. A 1 mil film of "Teflon" FEP perfluorocarbon was pressed against the treated surface of the polyimide at 300° C. for 10 minutes. The films adhered tightly to each other. This film laminate was heat-sealed to itself, with the perfluorocarbon coated sides together, at 300° C. for 0.5 minute. The seals had the following strengths: 1820 grams per inch tear seal, compared to only 680 grams (peel) for a control laminate in which the polyimide film had not received any surface treatment prior to lamination.

*Example 4*

A roll of film of the polypyromellitimide of bis(4-aminophenyl) ether was treated with a 1.0% aqueous solution of polyethylenimine containing 0.1% "Arquad C-50" (as in Example 1). The treated surface was then coated with "Teflon" FEP–C, and heat sealability was tested as coated-to-coated seals at 300° C., 2 seconds and 15 p.s.i., and as coated-to-uncoated seals at 350° C., 10 seconds and 20 p.s.i., with the following results: coated-to-coated seals ran as high as 4480 grams per inch tear seal compared to the maximum of 3140 grams per inch where no polyimide surface treatment was used. In coated-to-uncoated seals, the maximum for the samples treated with the quaternary ammonium chloride was 730 grams per inch (peel) compared to no seal at all for the controls.

*Example 5*

A 0.5% aqueous solution of a commercial product of which the active ingredient is a condensation product of a polymerized unsaturated fatty acid with ethylene diamine plus 0.5% of acetic acid, was sprayed onto a film of the polypyromellitimide of bis(4-aminophenyl) ether. This coated film was passed over a 270° C. roll. Part way around the roll, after the coating had dried and the quaternary salt decomposed, a freshly-extruded film of "Teflon" FEP fluorocarbon film is applied. Adhesion testing showed bonds of 900–1400 grams per inch tear seal. In a control without treating agent, the FEP coating fell from the film when unrolled.

The foregoing examples can be repeated as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

I claim:

1. The process of improving the adherability of a polyimide surface, said polyimide being characterized by a recurring unit having the following structural formula:

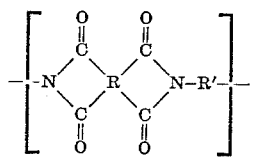

wherein R is a tetravalent radical containing at least six carbon atoms in a ring, said ring characterized by benzenoid unsaturation, the four carbonyl groups being attached to separate carbon atoms and each pair of carbonyl groups being attached to adjacent carbon atoms in the R radical; and wherein R' is a divalent benzenoid radical selected from the group consisting of

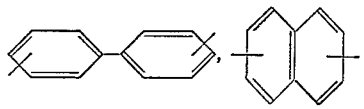

and

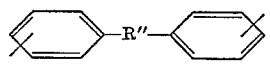

wherein R" is selected from the group consisting of an alkylene chain having 1–3 carbon atoms,

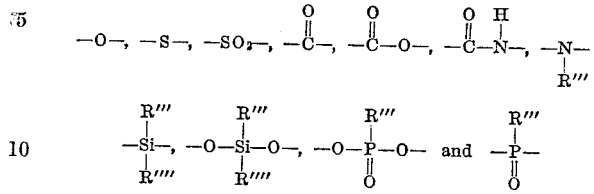

where R''' and R'''' are radicals having 1–6 carbon atoms and each is selected from the group consisting of alkyl and aryl; said process comprising the steps of (1) applying to said polyimide surface an aqueous solution containing from about 0.1 to 1.0% by weight of an agent selected from the group consisting of polyalkylenimines and polyalkylene polyamines and about 0.05 to 5.0% by weight of a cationic quaternary ammonium chloride and (2) heating the treated surface to at least the decomposition temperature of said quaternary ammonium chloride for a time sufficient to decompose said quaternary ammonium chloride and drive off the decomposition products.

2. The process as in claim 1 wherein R is derived from a dianhydride selected from the group consisting of pyromellitic dianhydride, 2,2-bis(3,4-dicarboxyphenyl) propane dianhydride, bis(3,4-dicarboxyphenyl) sulfone dianhydride and bis(3,4-dicarboxyphenyl) ether dianhydride.

3. The process as in claim 1 wherein R' is derived from a diamine selected from the group consisting of benzidine, 4,4'-diamino diphenyl propane, 4,4'-diamino diphenyl methane, 4,4'-diamino diphenyl ether, 4,4'-diamino diphenyl sulfone, 4,4'-diamino diphenyl diethylsilane, 4,4'-diamino diphenyl phenylphosphine oxide, 4,4'-diamino diphenyl N-methylamine, 4,4'-diamino diphenyl sulfide, 4,4'-diamino benzophenone, 3',4-diaminobenzanilide and 3,4'-diamino phenyl benzoate.

4. The process as in claim 1 wherein the polyalkylenimine is a polymer derived from the polymerization of at least one member of the group of 1,2-alkylenimines wherein the alkylene radical contains from 2 to 8 carbon atoms.

5. The process as in claim 1 wherein the polyalkylenimine has a molecular weight within the range of from about 30,000 to about 500,000.

6. The process as in claim 1 wherein said polyalkylenimine is a polyethylenimine having a viscosity within the range of from about 2.2 to about 2.8 centistokes as measured at 1% by weight concentration in water at 100° F.

7. The process as in claim 1 wherein said polyalkylene polyamine is selected from the group consisting of ethylene triamine, triethylene tetramine, tetraethylene pentamine and 3,3'-iminobispropylamine.

8. The process as in claim 1 wherein said quaternary ammonium chloride is selected from the group consisting of dodecyl trimethyl ammonium chloride, hexadecyl trimethyl ammonium chloride, octadecyl trimethyl ammonium chloride, dodecyl triethyl ammonium chloride, hexadecyl triethyl ammonium chloride, octadecyl triethyl ammonium chloride, dodecyl tri n-propyl ammonium chloride, dodecyl tri isopropyl ammonium chloride, benzyl hexadecyl dimethyl ammonium chloride, hexadecyl dimethyl ethyl ammonium chloride, diisobutyl phenoxyethyl dimethylbenzyl ammonium chloride, methyldodecylbenzyl trimethyl ammonium chloride, methyldodecyl xylylene bis(trimethyl ammonium chloride) and octadecyl benzyl dimethyl ammonium chloride.

9. The process as in claim 1 wherein said heating takes place at about 225° to 275° C.

(References on following page)

References Cited

UNITED STATES PATENTS

| | | | |
|---|---|---|---|
| 2,588,365 | 3/1952 | Dennett | 117—161 |
| 2,828,237 | 3/1958 | Rosser | 154—139 |
| 2,887,405 | 5/1959 | Wooding | 117—75 X |
| 3,140,196 | 7/1964 | Lacy et al. | 156—331 X |
| 3,179,634 | 4/1965 | Edwards | 117—138.8 X |
| 3,242,136 | 3/1966 | Endrey | 117—138.8 X |

WILLIAM D. MARTIN, *Primary Examiner.*

J. E. MILLER, Jr., *Assistant Examiner.*